United States Patent [19]

Parsons

[11] 4,284,989

[45] Aug. 18, 1981

[54] CHARACTER DISPLAY APPARATUS WITH FACILITY FOR SELECTIVELY EXPANDING THE HEIGHT OF DISPLAYED CHARACTERS

[75] Inventor: Robert Parsons, Cambridge, England

[73] Assignee: Texas Instruments Incorporated, Dallas, Tex.

[21] Appl. No.: 5,416

[22] Filed: Jan. 22, 1979

Related U.S. Application Data

[63] Continuation of Ser. No. 806,411, Jun. 14, 1977.

[30] Foreign Application Priority Data

Jun. 21, 1976 [GB] United Kingdom ............... 25660/76

[51] Int. Cl.[3] ............................................ G06F 3/14

[52] U.S. Cl. .................................... 340/731; 340/748; 340/750

[58] Field of Search ................ 340/731, 744, 748, 750

[56] References Cited

U.S. PATENT DOCUMENTS 3,895,375 7/1975 Williams ................................ 178/30

3,991,868 11/1976 Robinson et al. .................... 340/731

*Primary Examiner*—Marshall M. Curtis

*Attorney, Agent, or Firm*—Melvin Sharp; Gary C. Honeycutt; N. Rhys Merrett

[57] ABSTRACT

Apparatus for modifying an alphanumeric display produced on a cathode-ray tube screen by raster scan to enable the selective generation of double height characters. In order to retain synchronism between line counters and the raster number modifiers are connected to the outputs of the counters to modify the addresses selected from a read only memory for generating the characters.

16 Claims, 5 Drawing Figures

CHARACTER DISPLAY APPARATUS WITH FACILITY FOR SELECTIVELY EXPANDING THE HEIGHT OF DISPLAYED CHARACTERS

This is a continuation of application Ser. No. 806,411, filed June 14, 1977.

RELATED APPLICATION

Application Ser. No. 008,722, filed Feb. 2, 1979, which is a continuation of application Ser. No. 806,415, filed June 14, 1977, by Robert Parsons for APPARATUS FOR PROVIDING HOLD OVER OF AN EXISTING GRAPHICS SYMBOL DISPLAY TO FILL IN A BLANK SPACE CORRESPONDING TO OCCURRENCE OF A MODE CONTROL SIGNAL DURING A LINE OF A LINE SCAN DISPLAY SYSTEM, said application also assigned to the Assignee of the present application.

This invention relates to an alphanumeric character display apparatus and to a system incorporating such apparatus.

Under the name TELETEXT systems have been described for transmitting in coded form information written in alphanumeric characters, each character being represented by a respective code group. The characters are displayed on, for example, a television screen in rows so that the information can be read like the page of a book. For convenience a single frame of the display is referred to as a page and typically includes forty characters or character spaces in each of twenty-four rows. The coded information may be broadcast in one or more unused lines of a television signal and the information displayed on the cathode-ray tube of a television receiver. In an alternative arrangement the information is transmitted over a public or private telephone line from a computer or data storage means.

Codes have been proposed for TELETEXT transmission which include specific code groups for the numerals, both upper and lower case letters and certain punctuation marks. Such codes are included in the broadcast teletext specification published Sept. 1976 by the British Broadcasting Corporation, Independent Broadcasting Authority and British Radio Equipment Manufacturers Association. To some extent the use of capital letters enables emphasis to be given to particular words such as, for example, headings which make the page of information easier to read. If, however, it is considered that certain information is of sufficient importance to warrant special effort being made to draw it to the viewer's attention, then colour can be used to give emphasis to a particular word or words. However, if the display tube is a black and white tube colour cannot be used in this way. In addition to the alphanumeric information the codes used in TELETEXT transmissions allow for so-called "graphics" which are black and white patterns occupying the area of a character which can be combined together to produce maps or pictures in outline or silhouette. This facility could be used to produce a word or words of greater size than the normal characters, but it would be inconvenient to have to perform the special coding necessary to produce the result, particularly if the display had to be produced quickly, as in the case of an emergency, for example.

In order to overcome this problem it has been proposed to modify the operation of the display so that certain characters are produced having a height double that of the normal characters. This could be achieved simply by doubling the number of lines allocated to a particular row of characters. One particular character format used has seven horizontal rows, each of five elements, in a character area consisting of ten rows of seven elements so as to allow spaces between adjacent characters. Doubling the number of lines allocated to a row results in the production of characters having a height of fourteen rows and the width of five elements in each row, the character being defined in an area of twenty rows high by seven elements wide. Simply halving the line scan rate used for production of the character display information relative to the line scan of the raster defined on the television tube would achieve this result, although all characters in the row concerned would be formed of double height. A more serious disadvantage of such arrangement would be the loss of synchronism between the reading of the rows of information to be displayed in a page with the frame scan of the raster. In fact, if more than one row of double height characters were to be produced in this way special measures would have to be taken to restore synchronism between the reading of the information to be displayed and the scanning of the raster at the end of each frame.

It is an object of the present invention to avoid the above difficulties.

According to the present invention there is provided data display apparatus having a display means, such as for example a cathode-ray tube, on which, in use, a raster scan is generated, data storage means interrogated in synchronism with the raster scan for producing coded signals representing data symbols to be displayed by the display means, and signal generating means responsive to the coded signals to generate display signals for activating the display means to display elements of the data symbols which together form a visible display of the data symbols, each of the data symbols being defined by activated elemental areas in a plurality of adjacent lines of the scan over a predetermined length in each of the plurality of lines, wherein means is provided for synchronising the operation of the signal generating means with the raster scan selectively at two different rates so as to produce displays of data symbols of different heights. The data symbols may be alphanumeric characters or graphics symbols, for example.

The signal generating means may be a random access memory or a read only memory, which is read row by row in synchronism with the line scan of the raster to produce a display or characters or symbols of normal height and of which each row is read twice in synchronism with the line scan of the raster to produce a display of characters or symbols of double height.

It will be appreciated that double height characters occupy two rows of the display and the data stored in the storage means for the second row of the two containing double height characters should contain the same data as the preceding row in a character display system. According to one embodiment of the invention the data is transmitted to the storage means in this format. In one embodiment of the invention at least two control signals are provided indicating that the characters lying between them are to be displayed at double height. In any one row of the display, characters may be displayed at normal height and others at double height if allowance is made for the double height characters in the following row. Because it is possible that not all of the display apparatus receiving such a signal may be capable of generating double height characters, the duplicated data in the second row may be preceded by a control signal causing suppression of the display in such apparatus. The control signal indicating the characters to be displayed at double height would be arranged to cancel the display suppression signal in apparatus capable of producing the double height characters.

The doubling of the height may also be applied to graphics symbols and this may be achieved in the same way as for characters if the signal generating means used to generate the signals for displaying characters also generates the signals for the graphics symbols.

In another embodiment of the invention all of the characters and graphics symbols in the upper or lower half of a page to be displayed may be doubled in height in response to, for example, the operation of a switch available to the viewer; when a half page is doubled in height in this way the other half of the page would not be displayed at the time, but could be displayed subsequently under the control of another viewer operable switch.

In order that the invention may be fully understood and readily carried into effect it will now be described with reference to the accompanying drawings, of which:

Figure 1:
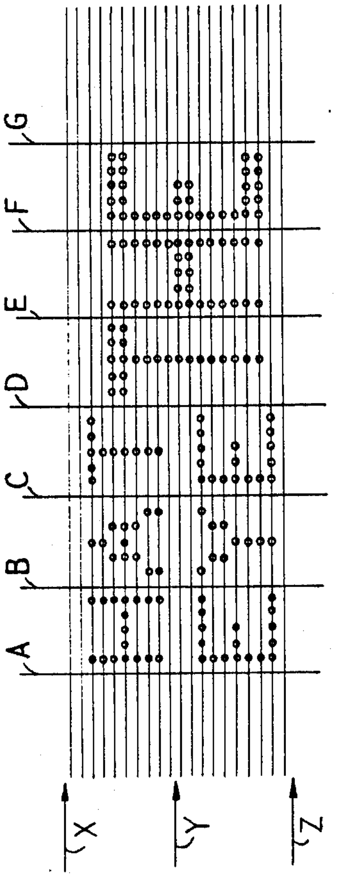
FIG. 1 is a diagram showing normal and double height characters displayed according to the formats described above.

In FIG. 1 there are shown twenty lines representing lines of a raster scanned on a cathode-ray tube. Ten of these lines lie between arrows X and Y and ten between arrows Y and Z. Seven lines, A, B, C, D, E, F, G, indicate division of the lines into six sections of equal length. The section between each adjacent pair of the lines A to G is seven elements long with the result that the area covered by the sections of the ten lines lying between arrows X and Y, for example, and between the lines A and B, is the area within which a normal height character is defined, corresponding to a dot matrix seven elements wide and ten elements high. The character in this space which is the letter H is defined from a 5×7 dot matrix and is seven elements high and five elements wide, thus allowing a space of two elements width between adjacent characters. In FIG. 1 the words HAT and EYE are shown formed of normal, i.e. 7 element height characters. The word THE is formed of double height characters in which each element of a normal height character is replaced by two elements one above the other in adjacent lines. Thus each double height character is defined in a dot matrix area seven elements wide by twenty elements high and occupies a width of five elements and a height of fourteen elements.

In a television system currently used in the United Kingdom the raster employed has 625 lines in a frame, using interlacing with two fields in a frame. Hence each field has 312.5 lines of which 240 lines would be used to display 24 rows of normal height alphanumeric data. In the following description the lines of the raster referred to are lines in the same field, the same data being displayed in both fields of a frame.

Figure 2:
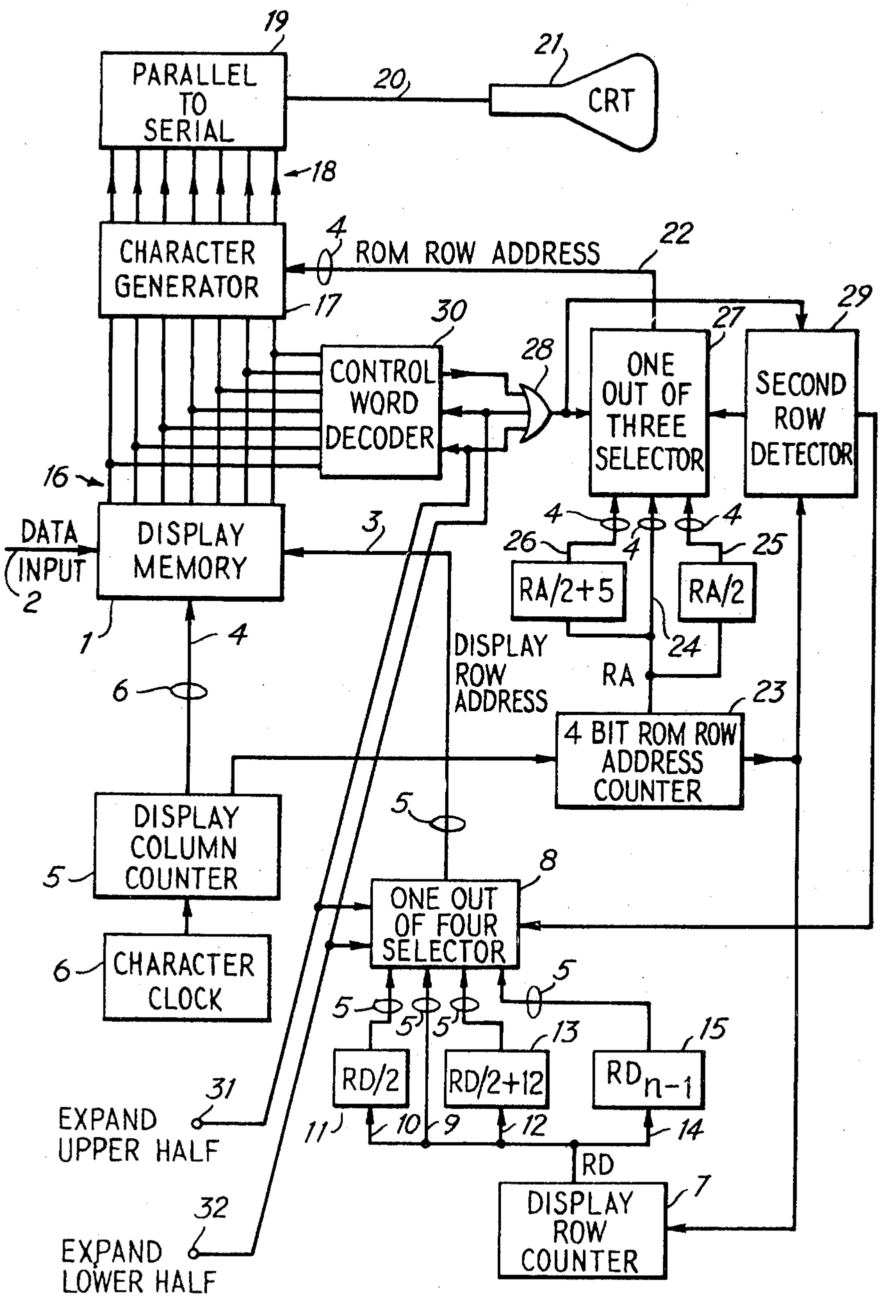
FIG. 2 is a block diagram of one example of apparatus according to the invention.

Referring to the example of the invention shown in FIG. 2, the information to be displayed is stored in coded form in a display memory 1, having been entered into that store over a data input line 2. The memory 1 has seven binary storage elements for each character stored and is able to store twenty-four rows of characters, each containing forty characters, i.e. the memory organization is 24×280. The information stored in the memory 1 is addressed via five display row address lines 3 identifying the row of the display in which the character lies and six display column address lines 4, the address representing the position of a character in a row of the display. The row and column binary address inputs are decoded by decoders included in the display memory 1. The display column address is obtained from a display column counter driven by pulses from a character clock 6. The counter 5 counts from 0 to 39 in response to character clock signals from the clock, so that the characters are available for display at forty equally spaced positions along a row. To allow for display margins the character clock frequency is approximately 64 times the line frequency. The display row address originates from a display row counter 7 having been routed along one of four paths by a one out of four selector 8. One of the four paths 9 is a direct connection so that the contents RD of the counter 7 form the new address. Another path 10 is via a unit 11 which halves the counter contents RD. A third path 12 is via a unit 13 which halves the contents RD of the counter 7 and adds 12 to the result. A fourth path 14 is via a unit 15 which produces a result equivalent to subtracting one from the contents RD of the counter 7 to give $RD_{n-1}$, the preceding row number. Pulses at one tenth line scan frequency of a television picture raster are applied from a ROM row address counter 23 to the display row counter 7 so that the display row address changes by one every ten lines of the raster. Thus each location of the memory 1 is addressed ten times in each field as the ten lines forming the row in which the character stored in that location are scanned.

The coded data read from the display memory 1 is fed in seven-bit parallel form over channel 16 to a character generator read only memory 17 to select from that memory display signals for causing a production of a display of the particular character. As a normal height character is defined over ten lines of scan, it follows that each character contains ten groups of display signals, each for a respective line of the scan. In each line of the scan a character may have up to seven elements or dots (for graphics symbols all seven may be used), and these appear in parallel on lines 18 as output from the generator 17 and are converted to serial form by a shifting register 19. The serial output of the register 19 is applied via a conductor 20 as a video signal to the control electrode of a cathode-ray tube 21 on the screen of which the display is produced.

ROM row address signals are applied to the character generator 17 via four lines 22 which originate from a ROM row address counter 23 to cause the selection of the groups of elements or dots in accordance with the lines of the raster scan. The counter 23 is a four bit binary counter which is arranged to count to ten cyclically and which counts successive lines of the raster scanned by the CRT 21, being responsive to pulses at line frequency produced as an output of the counter 5.

An output at one tenth line frequency from the counter 23 is applied to the counter 7 and to a second row detector 29. The count RA in the counter 23 reaches the lines 22 by one of three paths 24, 25 and 26 selected by a one out of three selector 27. The path 24 has direct connections for the four lines so that the count RA is applied to the ROM 17 without change. The path 25 is arranged to halve the count RA when it is applied to the ROM 17. The path 26 is arranged to halve the count RA and add five to the result. The selector 27 is connected to receive a first control input from an OR-gate 28 and a second control input from the second row detector 29, the function of which will be explained in detail later. The OR-gate 28 has three inputs, one from the output of a control word decoder 30, and two others respectively from an "EXPAND UPPER HALF" input 31 and an "EXPAND LOWER HALF" input 32. The inputs 31 and 32 are also connected to the one out of four selector 8 and the control word decoder 30. The control word decoder 30 is connected to the lines 16 to detect thereon one or more predetermined control words indicating that a double height display is to be produced and produces on its output a signal instructing the production of a double height display, which output is also applied by OR-gate 28 to the second row detector 29. A second output from the second row detector 29 is applied as a control input to the one out of four selector 8.

In the operation of the apparatus of FIG. 2, when reproducing characters of normal height, the selector 8 receives no control signals and is arranged to apply over line 9 the count RD from the counter 7 as row address to the display memory 1 and the selector 27 receives no control signals and is arranged to apply to the ROM 17 as the row address the count RA recorded in the counter 23 over line 24. In these circumstances as the CRT spot scans the raster, so there is read from display memory 1 in succession the characters (or graphics symbols) lying in the twenty-four rows of the page to be displayed. As each character nominally occupies a height of ten lines the counter 7 is driven by the output of the counter 23 which is at one-tenth of the line frequency. During the ten lines allocated to a particular row of characters, the number of the line being scanned at the time lying in a range 0 to 9, is applied via the selector 27 as address to the character generator ROM 17 to cause the correct groups of character elements to be read from the ROM 17 and applied to the CRT 21. During each of these ten lines the 7-bit codes representing the characters to be displayed are produced successively as outputs on the lines 16 from the display memory 1 under the control of the display column counter 5. The display row address from the counter 7 is not changed during these ten lines.

Double height characters may be required to be displayed either in small groups, for example to draw attention to a word and would be under the control of the broadcaster, or half a "page" at a time under the control of the viewer to enhance legibility. Both such controls result in the output of a signal from the OR-gate 28 when double height characters are required.

Figure 3:
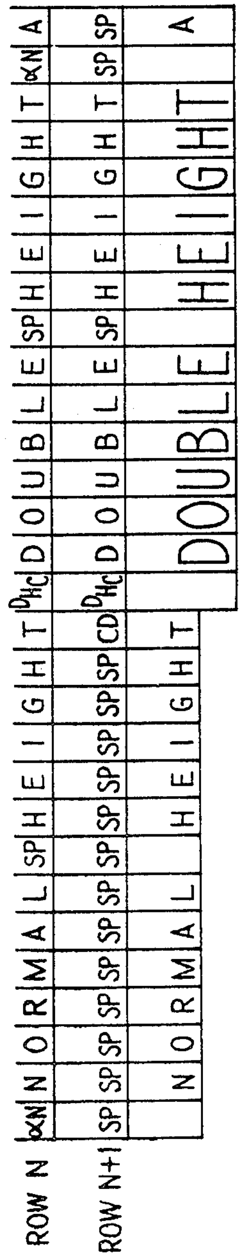
FIG. 3 is a diagram of the signals transmitted to the display memory of FIG. 2 for producing a double height character display.

If any groups of double height characters are to be produced a double height character signal DHC is broadcast at the start of each group and a normal character signal αN at the end of each group and appear in the same order on the lines 16 at the output of the display memory 1. The signal DHC immediately precedes characters which are to be reproduced at double height and is detected by the control word decoder 30 which immediately causes the gate 28 to produce a double height signal to start the modification of the ROM row address on the lines 22 fed from the counter 23 to the ROM 17. As explained above, when a double height character is to be produced the character elements from the ROM 17 are duplicated in a pair of successive lines. Thus, row addresses applied to the character ROM 17 in the case of normal height characters follow the sequence 0, 1, 2, 3, 4, 5, 6, 7, 8, 9, but when double height characters are to be produced the sequence 0, 0, 1, 1, 2, 2, 3, 3, 4, 4, is followed, because the path 25 from the ROM row address counter 23 is selected. It will be apparent therefore that during the ten lines allocated to the particular row of characters only the upper half of the character is fed out from the ROM 17. During the next ten lines of the scan at the same positions it is necessary for the lower halves of the characters to be read from the ROM 17, which means that the row addresses applied to the ROM 17 must follow the sequence 5, 5, 6, 6, 7, 7, 8, 8, 9, 9, which is provided by the selection of the path 26 from the ROM row address counter 23. The second row detector 29 is activated by the double height signal from the gate 28 and when activated responds to the outputs at tenth line frequency from the counter 23 to cause the selector 27 to select the paths 25 and 26 alternately for successive rows, i.e. groups of ten lines. It should be noted that the character information read from the display memory 1 must be the same in the second row as for the preceding row. This may be achieved as shown in FIG. 3 by arranging that the information transmitted includes two rows or parts of rows of characters which are the same where a double height display is required. However, this is not necessary with the apparatus shown in FIG. 2 because the second row detector 29 produces an output during the second row of a double height pair of rows which is applied to the selector 8 to cause the preceding row number $RD_{n-1}$ to be applied to the display memory 1 from the counter 7 by selection of the path 14.

Clearly if characters after those to be produced at double height are to be produced at normal height, then all that is required is for the selector 27 to select the path 24 again, so that the row address applied to the ROM 17 returns to the line count from the counter 23.

FIG. 3 shows one form of the signals from the page store 1 might take for producing normal height and double height characters in the same rows. In row N the coded letters "normal height" are preceded by a code group indicating thay the characters following it are of normal alphanumeric form, the symbol used in FIG. 3 for this being αN. Between the words the symbol SP is used to represent the code group for a space, and after the word "height" the code group for the symbol DHC for double height characters occurs. There then occur the words "double height" separated by space and followed by the normal alphanumeric symbol αN again. In the present example, the symbol αN is taken as terminating a group of double height characters so that the letter A following αN is to be reproduced at normal height. In row N+1 the part of the row lying under the words "normal height" is occupied by space symbols SP until just before the double height characters symbol which is aligned with the double height characters symbol in row N, where the symbol CD indicating "CONCEAL DISPLAY" occurs, the function of which will be described later. After the DHC symbol in row N+1 the words "double height" occur in alignment with the same words in row N. The symbols reproduced by the display apparatus are indicated beneath the signals showing how the normal height signals occupy the upper part of a pair of lines and double height signals occupy the full height of the pair of lines. Letter A is reproduced at normal height. The symbol CD standing for "CONCEAL DISPLAY" precedes DHC symbol so as to cause apparatus which is not provided with the double height character facility to conceal the second occurrence of the words "double height" so that the display on such apparatus is not spoilt. The control word decoder 30 is arranged to disable the effect of the conceal display instruction on the occurrence of the DHC symbol.

It will be appreciated that the normal height letters could occur in either or both of the two rows in which the double height characters are produced, and in this way a number of variations in the format of the display can be obtained.

Although, as mentioned above, the normal alphanumeric symbol $\alpha$N is used to cancel the DHC instruction, it will be apparent that other control signals may be used alternatively or additionally for this function as control signals not specifying that the following symbols are to be displayed at double height are treated as instructing a normal height display.

When the viewer wishes to have the information displayed at double height, for example because the normal height display is too small for legibility, he operates one of two switches which respectively cause the upper half page to be displayed at double height and the lower half page to be displayed at double height. Since only half a page can be displayed at double height at any time, the half page which is not required is suppressed. The operation of the switch causing the upper half page to be displayed at double height results in a signal being applied to the terminal 31 of FIG. 2 which switches the selector 8 to select the path 10 from the counter 7 so that one half of the display row number RD is applied as row address to the display memory. To avoid the generation of half fractions when odd numbers are halved, the halving may be effected by a right shift of the number in binary code and the resulting least significant bit ignored. The signal applied to the terminal 31 also passes through the OR-gate 28 to instruct the display of double height characters as described above, and moreover is applied to the decoder 30 to inhibit its operation in the event that the half page selected by the viewer to be displayed at double height includes a group of characters required by the broadcaster to be displayed at double height.

The expansion of the lower half page is similar except that the selector 8 selects the path 12 so that RD/2+12 is used as the display row address applied to the display memory 1. As there are 24 rows in a page of information to be displayed it follows that RD/2+12 goes from 12 to 23 as RD goes from 0 to 23. The generation of halves may be avoided as mentioned above by effecting the halving by means of a right shift of the number expressed in binary code.

Figure 4:
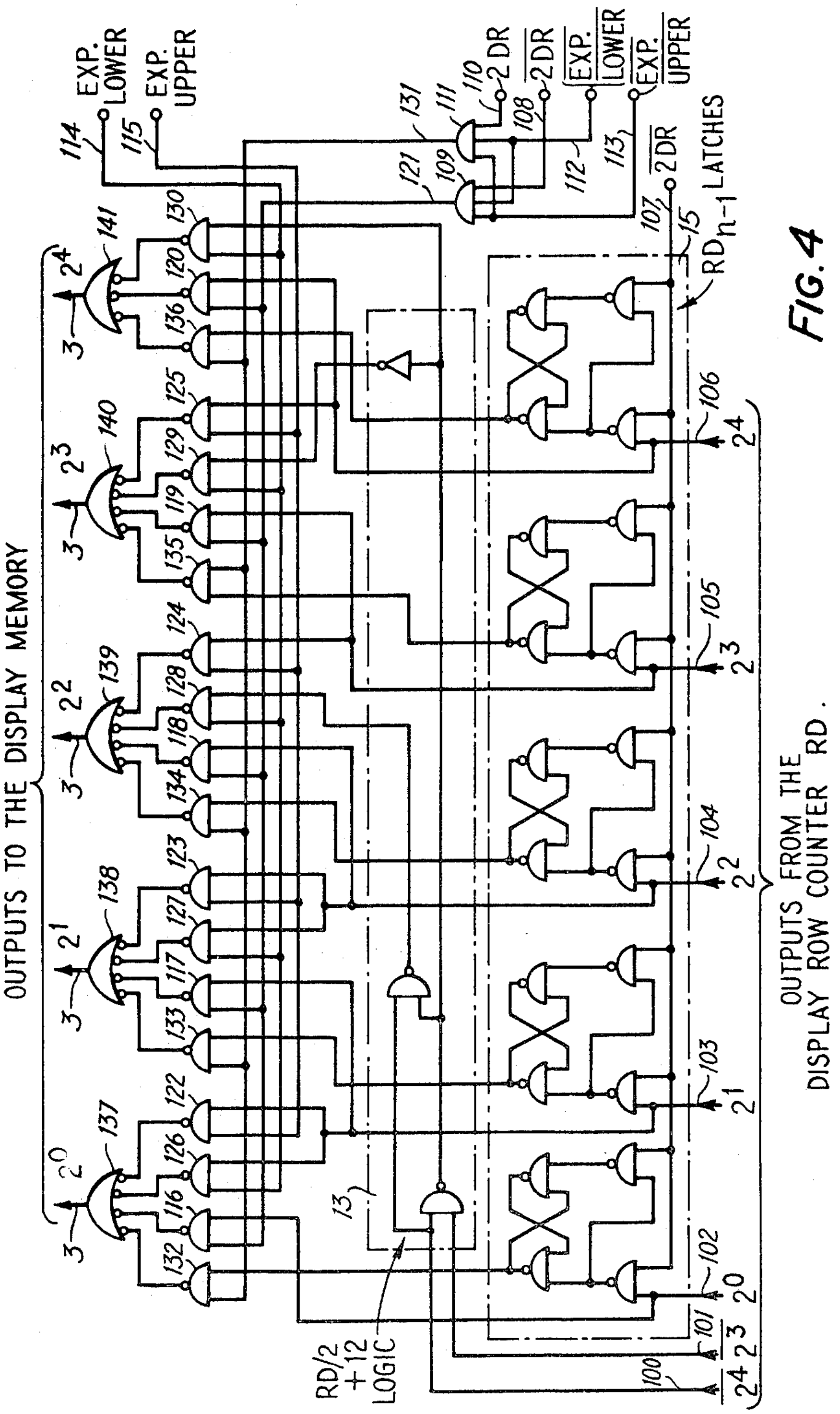
FIG. 4 is a diagram of the display row logic of FIG. 2.

FIG. 4 shows in detail one example of logic suitable for the selector 8 and the blocks 11, 13 and 15 of FIG. 2. Where possible the appropriate references from FIG. 2 are shown on FIG. 4. The counter 7 of FIG. 2 is assumed to be a five stage binary counter connected to count from 0 to 23 cyclically and having outputs $2^0$, $2^1$, $2^2$, $2^3$ and $2^4$ from the five stages respectively. These outputs together with the complements of the $2^3$ and $2^4$ outputs are applied to the conductors 100 to 106 as shown in FIG. 4. The conductors 102 to 106 are connected to respective inputs of five latches which together form the block 15, the latches being arranged to record the input row number RD from the counter 7 as long as a conductor 107 is high. The conductor 107 receives an output $\overline{2DR}$ from the second row detector 29 (FIG. 2) which becomes low when the second row of a pair of rows containing double height characters occurs so that the previous row number $RD_{n-1}$ remains stored in the latches. The output $\overline{2DR}$ is also applied via a conductor 108 to an AND-gate 109 and the complementary output 2DR is applied via a conductor 110 to an AND-gate 111. Both gates 109 and 111 receive as inputs $\overline{\text{EXP LOWER}}$ and $\overline{\text{EXP UPPER}}$ which are the complements of the signals applied to the terminals 32 and 31 respectively (FIG. 2), via conductors 112 and 113. The signals EXP LOWER and EXP UPPER are applied to conductors 114 and 115 respectively.

When the output RD of the counter 7 is to be applied to the display memory 1 as address, NAND-gates 116, 117, 118, 119 and 120 are opened because the output of AND-gate 109 on the conductor 121 is high as the signals $\overline{2DR}$, $\overline{\text{EXP LOWER}}$, and $\overline{\text{EXP UPPER}}$ are all high.

When RD/2 is to be used as the address (i.e. during display of the upper half page at double height) NAND-gates 122, 123, 124 and 125 are open, because the signal EXP UPPER is applied to the conductor 115. An inspection of FIG. 4 will reveal that the number RD output of the counter 7 is subjected to a right shift and therefore division by 2 under these conditions.

During display of the lower half page, the signal EXP LOWER is applied to the conductor 114 which opens NAND-gates 126, 127, 128, 129 and 130. In this case the number RD output of the counter 7 is subjected to a right shift and is then incremented by 12 by means of the logic in the broken rectangle 13 in FIG. 4 (corresponding to the unit 13 of FIG. 2).

When $RD_{n-1}$ is selected by the selector 8 and the AND-gate 111 produces a high level on a conductor 131 which opens NAND-gates 132, 133, 134, 145 and 136 passing $RD_{n-1}$ as address to the display memory 1 from the latches in the unit 15. As explained above, the signal $\overline{2DR}$ prevents the latches from following the counter 7 and therefore the latches store the previous row number.

The outputs of the gates 116, 122, 126 and 132 are applied to inputs of a gate 137 acting as an OR-gate to produce the 2° digit of the row address applied to the display memory 1. Similarly other gates 138, 139, 140 and 141 pass the outputs of the other NAND-gates to the lines 3 carrying the $2^1$, $2^2$, $2^3$ and $2^4$ digits of the row address.

Figure 5:
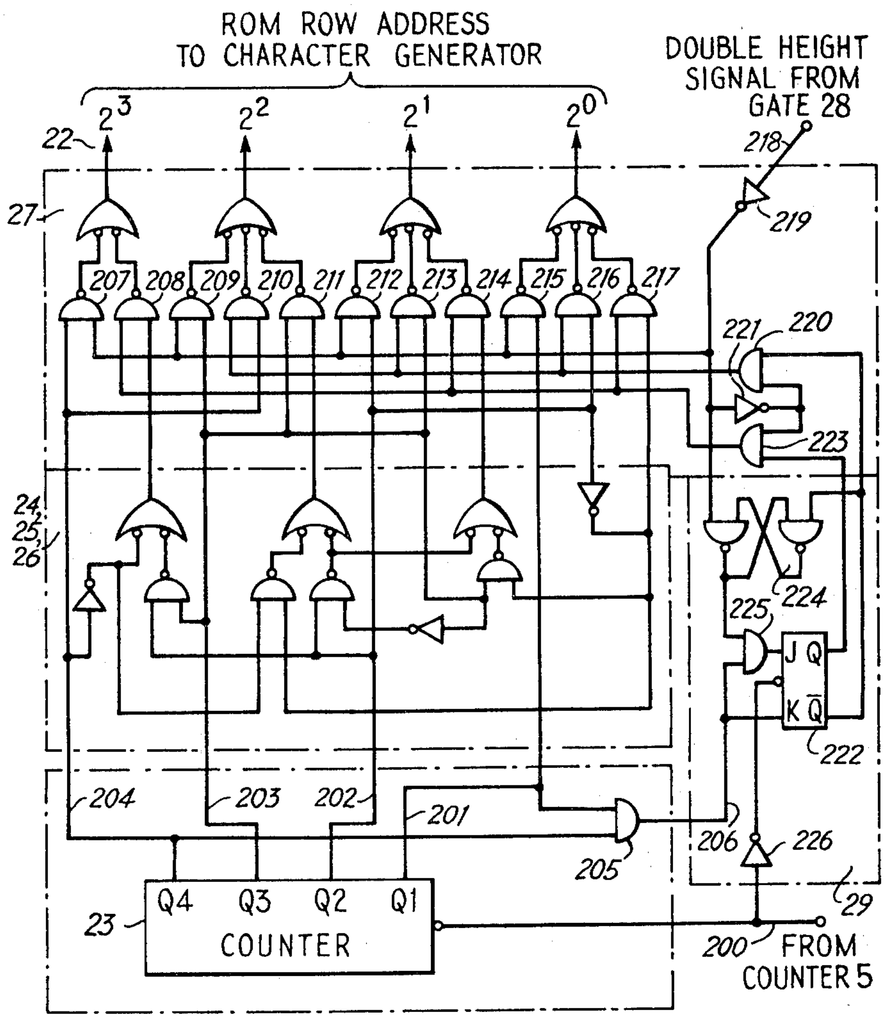
FIG. 5 is a diagram of the row address logic for the character generator of FIG. 2.

FIG. 5 shows in detail the logic of the one out of three selector 27, its associated paths 24, 25 and 26 for the ROM row address and the second row detector 29 of FIG. 2. The counter 23 is also shown. All these components are included in broken line outlines in FIG. 5 bearing the numbers used in FIG. 2.

The line frequency pulses from the counter 5 are applied to the counter 23 via a conductor 200 and the $2^0$, $2^1$, $2^2$ and $2^3$ digit outputs of the counter 23 appear on conductors 201, 202, 203 and 204. An AND-gate 205 receives the $2^0$ and $2^3$ outputs of the counter 23 and products an output on a conductor 206 when the total in the counter 23 reaches 9; it will be remembered that the counter 23 counts from 0 to 9 cyclically. Therefore the pulses on the conductor 206 are at one tenth line frequency.

The paths 24, 25 and 26 consist of a number of conductors and logical elements and connect the signals on the conductors 201 to 204 to the inputs of NAND-gates 207 to 217. The output of the counter 23 being RA, the number RA/2 is produced by a right shift as used in FIG. 4, and the number RA/2+5 is produced by the right shift together with the effect of the logical elements shown in the outline 24, 25, 26 of FIG. 5.

When the path 24 is selected, so that RA is passed unchanged to the lines 22 as the ROM row address, the NAND-gates 207, 209, 212 and 215 are open, the conductors 204, 203, 202 and 201 from the counter 23 being respectively connected as inputs to those gates. The double height signal from the gate 28 (FIG. 2) is applied via a conductor 218 and an inverter 219 to the gates 207, 209, 212 and 215 so that these gates are open unless there is a double height signal.

When RA/2 is used as the ROM row address, the gates 210, 213 and 216 are open thus providing the right shift. The gates 210, 213 and 216 are opened by the output signal of an ANDgate 220 which has as one input the double height signal, inverted a second time by an inverter 221 and as the other input the $\overline{Q}$ output of a J-K flip-flop 222 in the second row detector 29.

The Q output of the flip-flop 222 is high during the second row of a pair of rows in which double height characters occur, and this output causes an AND-gate 223 to produce an output if the double height signal from the inverter 221 is present. In this case the NAND-gates 208, 211, 214 and 217 are open so that RA/2+5 is applied as the ROM row address to the lines 22. Inspection of the circuit will reveal the manner in which the logical elements within the broken line outline 24, 25, 26 convert an input RA into RA/2+5.

In the second row detector 29 the state of the J-K flip-flop 222 indicates whether the current row is or is not the second of a pair of rows in which double height characters occur. A second bistable 224 produces a high output to an AND-gate 225, when a double height signal is output from the gate 28, and it is reset by the $\overline{Q}$ output of the flip-flop 222. The tenth line frequency pulses on the conductor 206 are applied to the K input of the flip-flop 222 and also via the AND-gate 225 to its J input, so that $\overline{Q}$ is high except for even numbered rows following the occurrence of a double height signal. The line pulses on the conductor 200 after inversion by an inverter 226 are used as clock signals for the flip-flop 222.

All of the other units of FIG. 2 could be standard integrated circuit components, for example, except for the control word decoder 30 which might be a specially constructed logical circuit which responds to the DHC symbol code to produce an output signal, together with a bistable for storing the signal which is reset by any other of the control signals used in the system. The EXPAND UPPER HALF and EXPAND LOWER HALF inputs would be arranged to inhibit the operation of the detector.

Although the invention has been described with respect to a specific example of apparatus particularly suited to the reception of TELETEXT transmissions, it will be apparent that the invention can equally be applied to the production of double height characters or graphics symbols on any kind of display employing a scanning display means similar to cathode-ray tube, for example. One such use of the invention is in a visible display unit connected to a computer.

I claim:

1. Data display apparatus having a display means, a clock signal generator, means for generating a raster scan on said display means synchronized with a clock signal generated by said clock signal generator, data storage means for storing a common set of character data for use in generating character displays in each of a plurality of modes, and means operable in conjunction with said data storage means for activating said display means comprising:

first counter means, connected to the clock signal generator, for interrogating the data storage means in synchronism with the raster scan to produce coded signals representing data symbols to be displayed by the display means;

second counter means, connected to the clock signal generator, for providing an output indicative of the scan currently being described on the display means;

logic means, connected to the first and second counter means, for modifying, and synchronizing with the raster scan, the outputs of the first and second counter means; and signal generating means, connected to the logic means, operable to activate the display means to display elements of data symbols in lines of the raster scan which together form a visible display of the data symbols, each data symbol being defined by activated elemental areas in a plurality of succeeding lines of the scan over a predetermined length in each of the plurality of lines, said signal generating means further operable to activate the display means in different modes to produce a display character of one height in one mode and a display character of a different height in another mode; and said logic means providing for synchronization, selectively, at two different rates, of the signal generating means with the raster scan, so as to selectively produce displays of data symbols of different heights.

2. Apparatus according to claim 1, wherein the signal generating means includes a read only random access memory having a first address input for receiving coded signals representing data symbols, a second address input, connected to the output of the logic means for receiving a number indicating which of the plurality of lines of the scan is currently being described on the display means, and an output for transmitting the display signals.

3. Apparatus according to claim 1, wherein the second counter is cyclic and is incremented by the clock signal generator at the line frequency of the raster scan.

4. Apparatus according to claim 2, wherein the second logic means is selectively switchable to produce a first address signal which equals the total recorded in the second counter means and a plurality of second address signals each of which consists of a different predetermined fractional group of numbers derived from the total recorded in the second counter means.

5. Apparatus according to claim 4, in which the displays of the data symbols are respectively at either a normal height or at a double normal height, and in which there are two second address signals each of which consists of a different half of the numbers from the second counter means, each number occurring twice in succession.

6. Apparatus according to claim 1 including means for applying a control signal to the logic means for synchronizing the operation of the signal generating means with the raster scan so as to cause a display of data symbols to be produced having the greater of the different heights.

7. Apparatus according to claim 6, including means for detecting predetermined instruction signals among the coded signals read from the data storage means and for producing the control signal starting when a first predetermined instruction signal is detected and ending when a second predetermined instruction signal is detected.

8. Apparatus according to claim 6, including manually operable means for enabling the selective generation of the control signal.

9. Apparatus according to claim 8, wherein the data storage means has a plurality of addresses, at each of which a coded signal can be stored, the addresses being in groups corresponding respectively to the rows of data symbols forming the display, the addresses within each group being addressed cyclically and repeatedly as many times as lines of the raster required to describe a row of data symbols in synchronism with the raster scan, the apparatus including means responsive to the operation of the manually operable means to multiply the number of repetitions of cyclic addressing operations of the addresses within each group by a small integer.

10. Apparatus according to claim 9, wherein the data storage means is addressed in dependence on the total recorded in the first counter means and the logic means is responsive to the operation of the manually operable means selectively to produce a modified address from the total in the first counter.

11. Apparatus according to claim 9 or 10, wherein the small integer is two.

12. Apparatus according to claim 11, wherein the manually operable means includes two switches, the operation of one of which results in one half of the groups of addresses being addressed and the operation of the other of which results in the other half of the groups of addresses being addressed.

13. Apparatus according to claim 1, wherein the data symbols include alphanumeric characters.

14. Apparatus according to claim 1, wherein the data symbols include graphics symbols.

15. Data display apparatus for generating a raster scan display at a predetermined line scan frequency, comprising:

digital data storage means organized as an M-row by N-column matrix, means for selectively interrogating each column of the memory in synchronism with said raster scan on a row-by-row basis at either one of two submultiples of the said line scan frequency for producing coded signals representing data symbols for display, signal generating means responsive to said coded signals for generating display signals comprising digital data signals at selected locations during each line scan, each display signal defined over X- elemental areas of a line scan and over Y line scans when said memory is interrogated at one of said two multiples of said line scan frequency; and each said display signal is defined over NX elemental areas of a line scan and over NY line scans when said memory is interrogated at the other one of said two multiples of the line scan frequency, where n is a small integer.

16. A raster scan data display system having a display means comprising:

data storage means for storing character data symbol information, means for interrogating the data storage means in synchronism with the raster scan for producing coded signals representing character data symbols to be displayed as multiple scan rows by the display means:

control decode means connected to the data storage means for providing a character height output signal in response to a character height select signal from the data storage means and in response to externally activated expand partial page signals, character generator means, connected to the data storage means for generating multi-row character element signals corresponding to the display means representation of the coded signals, and having a single row of the multi-row signals selectable in response to a character row select signal;

row detector means, connected to the control decode means, for providing a row repeat signal output so as to cause the display to re-scan the row of previously displayed data at the next display scan row.

character row counter means for providing character row address signals is synchronization with the raster scan;

character row select means connected to the row detector means, to the control decode means, to the character row counter means, and to the character generator means, for providing connection of the character row address signals to the character row counter means to select in synchronization with the raster scan the single row of character elements corresponding to the character data symbols together with the charact height as encoded in the respective output of the data storage means.

* * * * *